United States Patent
Konishi et al.

(10) Patent No.: US 9,476,395 B2
(45) Date of Patent: Oct. 25, 2016

(54) CONTROL DEVICE FOR A HYBRID VEHICLE

(75) Inventors: Yasuhiro Konishi, Atsugi (JP); Kakuzou Kaneko, Ebina (JP); Susumu Kubo, Yokohama (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 27 days.

(21) Appl. No.: 14/343,153

(22) PCT Filed: Aug. 10, 2012

(86) PCT No.: PCT/JP2012/070525
§ 371 (c)(1),
(2), (4) Date: Mar. 6, 2014

(87) PCT Pub. No.: WO2013/038857
PCT Pub. Date: Mar. 21, 2013

(65) Prior Publication Data
US 2014/0210216 A1    Jul. 31, 2014

(30) Foreign Application Priority Data
Sep. 14, 2011    (JP) .................................. 2011-200582

(51) Int. Cl.
*H02P 9/00*    (2006.01)
*H02P 5/00*    (2016.01)
(Continued)

(52) U.S. Cl.
CPC ............ *F02N 11/0803* (2013.01); *B60K 6/48* (2013.01); *B60K 6/543* (2013.01); *B60W 10/02* (2013.01); *B60W 10/06* (2013.01); *B60W 10/08* (2013.01); *B60W 20/00* (2013.01); *B60W 20/17* (2016.01);
(Continued)

(58) Field of Classification Search
CPC ...... F02N 11/00; F02N 11/006; F02N 11/04; F02N 11/0803; F02N 11/0844; F02N 2200/022; F02N 2200/0801; F02N 2200/101
USPC ..................... 290/40 C, 38 R; 903/906, 902; 180/65.26, 65.28, 65.285
See application file for complete search history.

(56) References Cited

U.S. PATENT DOCUMENTS 5,771,478 A * 6/1998 Tsukamoto et al. ............ 701/68
6,018,198 A * 1/2000 Tsuzuki et al. .................. 290/17
(Continued)

FOREIGN PATENT DOCUMENTS

JP    11-82261 A    3/1999
JP    2005-12966 A    1/2005
(Continued)

OTHER PUBLICATIONS

International Search Report for corresponding International Application No. PCT/JP2012/070525, mailed Sep. 4, 2012 (4 pages).

*Primary Examiner* — Julio C. Gonzalez Ramirez
(74) *Attorney, Agent, or Firm* — Osha Liang LLP (57) ABSTRACT

A control device for a hybrid vehicle has an engine, a starter motor that starts the engine, a driving motor that transmits a motor torque to the engine and a drive wheel, a starting motor selective control unit that starts the engine using the starter motor in response to a driving force request by a driver of the hybrid vehicle during a selected mode of operation in which the driving motor serves as the driving source, and that starts the engine using the driving motor in response to a system request.

18 Claims, 6 Drawing Sheets

(51) Int. Cl.
  *F02N 11/08* (2006.01)
  *B60K 6/48* (2007.10)
  *B60K 6/543* (2007.10)
  *B60W 10/02* (2006.01)
  *B60W 10/06* (2006.01)
  *B60W 10/08* (2006.01)
  *B60W 20/00* (2016.01)
  *F02N 11/00* (2006.01)
  *F02N 11/10* (2006.01)
  *F02N 5/04* (2006.01)
  *F02N 11/04* (2006.01)

(52) U.S. Cl.
  CPC .............. *B60W 20/40* (2013.01); *F02N 11/00* (2013.01); *F02N 5/04* (2013.01); *F02N 11/006* (2013.01); *F02N 11/04* (2013.01); *F02N 11/0844* (2013.01); *F02N 11/101* (2013.01); *F02N 2011/0896* (2013.01); *F02N 2200/022* (2013.01); *F02N 2200/0801* (2013.01); *F02N 2200/0802* (2013.01); *F02N 2200/101* (2013.01); *F02N 2300/2002* (2013.01); *F02N 2300/304* (2013.01); *Y02T 10/6221* (2013.01); *Y02T 10/6286* (2013.01); *Y02T 10/7258* (2013.01)

(56) References Cited

U.S. PATENT DOCUMENTS

| | | | |
|---|---|---|---|
| 6,048,289 A | * | 4/2000 | Hattori et al. .................. 477/15 |
| 7,734,401 B2 | * | 6/2010 | Joe et al. ......................... 701/54 |
| 2011/0053735 A1 | * | 3/2011 | Lewis et al. .................... 477/99 |

FOREIGN PATENT DOCUMENTS

| | | |
|---|---|---|
| JP | 2006-103626 A | 4/2006 |
| JP | 2006-298363 A | 11/2006 |
| JP | 2006-304509 A | 11/2006 |
| JP | 2010-241331 A | 10/2010 |

\* cited by examiner

| Shift range | Operation | Vehicle state | | Scene | Startup pattern |
|---|---|---|---|---|---|
| P,N | IGN ON | Stop | | Startup request | Driving motor |
| D | — | | | System request | Driving motor |
| | Brake ON | | | System request | Driving motor |
| | Brake OFF | | Deceleration (downhill, flat, uphill) | System request | Driving motor |
| | | In running state | Coasting deceleration (flat, uphill) | System request | Driving motor |
| | | | Coasting deceleration (downhill) Auto up shift | System request | Driving motor |
| | | | | Depart from EV travel region | Driving motor |
| | Constant Accel. opening | | Const. speed (flat, uphill) | System request | Starter |
| | | | Acceleration (downhill, flat, uphill) Auto up shift | System request | Starter |
| | | | | Depart from EV travel region | Starter |
| | | | Deceleration (uphill) | System request | Starter |
| | △APO Small | | Acceleration (flat, uphill) Auto up shift | System request | Starter |
| | | | | Driving force request | Driving motor |
| | | | Acceleration(downhill), Auto up shift | Depart from EV travel region | Starter |
| | | | | System request | Starter |
| | △APO Large | | Deceleration (uphill), Auto down shift | Driving force request | Starter |
| | | | | System request | |
| | | | Acceleration (downhill, flat, uphill) Auto up shift, Depressing down shift | Driving force request | Starter |

CONTROL DEVICE FOR A HYBRID VEHICLE

CROSS-REFERENCE TO RELATED APPLICATIONS

This present application claims priority to Japanese Patent Application No. 2011-200582 filed on Sep. 14, 2011, which is incorporated herein by reference in its entirety.

BACKGROUND

1. Technical Field

The present invention relates to a control device for a hybrid vehicle equipped with a starter motor for starting the engine.

2. Related Art

A conventional control device for a hybrid vehicle is known in which, during running in an EV mode using a drive motor as driving source, an engine is caused to be started using a starter motor at all times.

Patent Document 1: JP Patent Application Publication No. 11-82261

SUMMARY

However, in the conventional control device for a hybrid vehicle, when starting the engine, the starter motor may always be used. Thus, at the start-up of the engine in running condition in which background noise environmental noise) is at low level, a jump-in gear sound or driving sound of the starter motor will be heard by the driver. In particular, when an engine starting scene occurs, in which the engine will be started due to a system initiative request against the intention of the driver, the situation would give a sense of discomfort to the occupant.

One or more embodiments of the present invention provides a control device for a hybrid vehicle that can reduce the discomfort to the occupant due to the engine start sound in an engine starting scene caused by a system request.

A control device for a hybrid vehicle according to one or more embodiments of the present invention is configured to include an engine, a starter motor, a driving motor, and a starting motor selective control unit.

The starter motor is configured to start the engine.

The driving motor is configured to transmit a motor torque to both the engine and the drive wheels.

The starting motor selective control unit is operative to start the engine using the starter motor in response to a driving force request during a selected mode of operation in which the driving motor serves as driving force is being selected, while, in response to a system request, the engine is started using the driving motor.

Thus, during a selected mode of operation using the driving motor as drive source, in response to a drive force request, the engine startup will be performed using the starter motor.

Therefore, although, in a state in which background noise is small, the engine start sound will reach the driver, because this represents an engine start sound corresponding to an accelerator depressing operation, which in turn is reflected in the accelerator depressing operation in response to the intention of the driver requesting for a driving force, the associated engine start sound would not become uncomfortable for the driver. In addition, in the presence of request for a driving force, by assigning the engine start operation to the starter motor, the torque from the driving motor may be used as a driving torque to the drive wheels so that expansion of the travel area of the mode in which the driving motor is used as driving source can be achieved.

On the other hand, during the mode in which the driving motor is used as driving source, in response to a system initiated request, an engine startup will be performed using the driving motor.

As examples of the engine startup due to the system request, such scenes are conceivable as a reduction in battery charge capacity, increase in air conditioning load, an increase in power consumption other than the driving force, and the like. Specifically, the engine startup due to the system request is unpredictable for the driver as to the time at which the engine startup is performed. Therefore, in the case of an engine startup due to the system request, by assigning to the driving motor which exhibits a better sound vibration performance compared to an engine startup by the starter motor, to assume the engine starting operation, discomfort to the occupant by the engine start sound is reduced.

As a result, it is possible in the engine starting scene in response to the system request to reduce the discomfort to the occupant by the engine start sound.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a description is given of the configuration.

The configuration of a control device according to one or more embodiments of the present invention of FF hybrid vehicle (an example of the hybrid vehicle) will be described separately with respect to an "overall system configuration" and "starting motor selective control configuration".

[Overall System Configuration]

Figure 1:
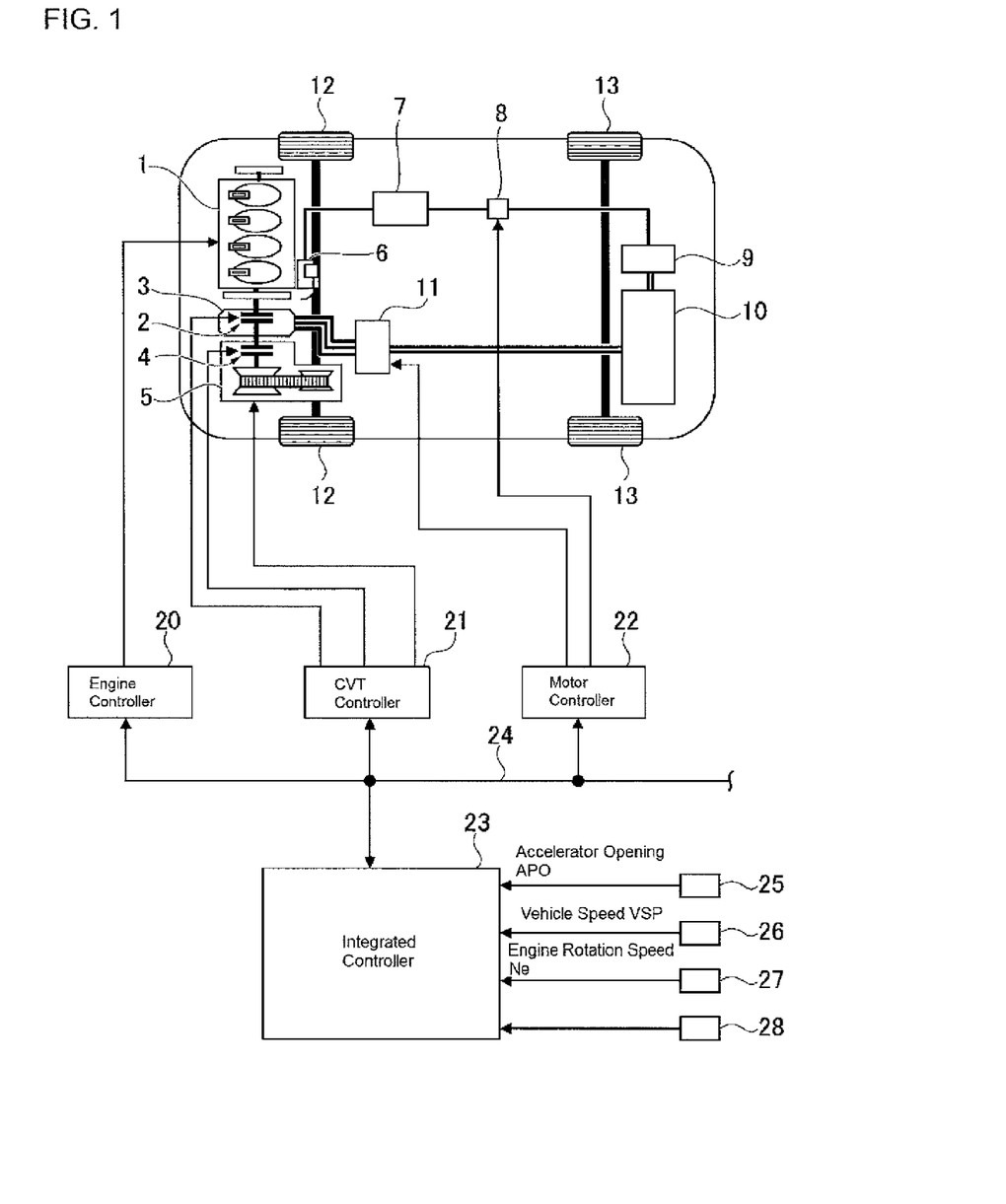
FIG. 1 is an overall system diagram showing a control device for an FF hybrid vehicle 1 according to one or more embodiments of the present invention.

FIG. 1 is an overall system diagram showing the FF hybrid vehicle to which the control device according to one or more embodiments of the present invention is applied. Below, with reference to FIG. 1, the overall system configuration of the FF hybrid vehicle is described.

As shown in FIG. 1, the FF hybrid vehicle is provided with an engine 1, a first clutch 2, a motor/generator 3 (driving motor), a second clutch 4, a belt type continuously variable transmission 5, a starter motor 6, a low voltage battery 7, a start-up relay circuit 8, a DC/DC converter 9, a high voltage battery 10, and an inverter 11. Incidentally, the reference numeral 12, 12 indicates a front wheel (drive wheel), while the reference numeral 13, 13 depicts a rear wheel.

The engine 1 is a gasoline engine or a diesel engine, and operative, on the basis of the engine control command from an engine controller 20, to carry out an engine startup control, an engine stop control, a valve opening control of a throttle valve, and a fuel-cut control.

The first clutch 2 is a clutch that is interposed between the engine 1 and the motor/generator 3. Based on a control command from the CVT controller 21, by a first clutch hydraulic pressure (CL1 hydraulic pressure) produced by a control unit (not shown), engagement and release thereof is selectively controlled.

The motor/generator 3 is a synchronous motor/generator stator in which permanent magnets are embedded in the rotor coil while a stator coil is wound around a stator. The motor/generator 3 is driven by applying a three-phase alternating current that is produced by the inverter 11 on the basis of the control command from the motor controller 22. The motor/generator 3 is operable as an electric motor (driving operation) to rotate with power being supplied from the high-voltage battery 10 via the inverter 11. Further, the motor/generator 3 functions as an electric generator to generate an electromotive force at both ends of the stator coils to charge the high-voltage battery via the inverter 11 (regeneration).

The second clutch 4 is a clutch that is interposed between a motor shaft and an input shaft of the transmission in a drive line between the motor/generator 3 and left and right front wheels 12, 12. Similar to the first clutch 2, the second clutch is controlled in an engagement, slip-engagement, and release states by a second clutch hydraulic pressure (CL2 pressure) produced by the hydraulic unit (not shown) on a basis of a control command from the CVT controller 21.

The belt type continuously variable transmission (CVT) 5 is disposed at a position downstream of the second clutch 4, to continuously vary or change the speed ratio automatically corresponding to a target input rotation speed based on a vehicle speed VSP and an accelerator pedal opening AP0. In the belt type continuously variable transmission 5, due to a first primary hydraulic pressure and a secondary hydraulic pressure produced by a hydraulic unit (not shown) based on a control command from the CVT controller 21, a speed ratio represented by a ratio of winding diameters of a pair of pulleys around which a belt is wound.

A differential gear (not shown) is coupled to an output shaft of the belt type CVT 5, and the left and right front wheels 12, 12 are provided via a left and right drive shafts bifurcated from the differential gear, respectively.

The starter motor is a motor dedicated for starting the engine 1, and a direct current motor driven upon receipt of power supply from a low voltage battery 7, when turning the startup relay circuit 8 based on a control command from the motor controller 22. Note that the low voltage battery 7 is charged with a direct current, high voltage from the high voltage battery 10 converted into a direct current, low voltage via a DC/DC converter 9.

Based on a control command from the motor controller 22, the inverter 11 is operative to drive the motor/generator 3 during a driving mode by converting a direct current from the high voltage battery 10 into a three-phase alternating current. Further, during regenerative mode, the three-phase alternating current from the motor/generator 3 is converted into a direct current to charge the high voltage battery 10.

The FF hybrid vehicle includes, as drive modes depending on the difference in driving methods), an electric vehicle drive mode (hereinafter, referred to as "EV mode") and a hybrid vehicle drive mode (hereinafter, referred to as "HEV mode").

The "EV mode" represents a mode in which the vehicle is propelled by the motor/generator as driving power source with the first clutch CL1 in a released state, and propels the vehicle in either a motor drive mode or a regenerative mode. The "EV mode" is selected when a driving force request is low and the battery state of charge SOC is secured.

The "HEV mode" represents a mode that drives the vehicle by both the engine ENG and the motor/generator 3 as driving power source, and propels the vehicle in any one of a motor-assist drive mode, a power generation drive mode, and an engine drive mode. The "HEV mode" is selected when the demand for high driving force is detected or the battery SOC indicates a capacity sufficient.

As shown in FIG. 1, the control system of the FF hybrid vehicle is configured to have an engine controller 20, a CVT controller 21, a motor controller 22, and an integrated controller 23. Note that the each controller 20, 21, 22 and the integrated controller 23 are connected via a CAN communication line 24 for mutual exchange of information.

The engine controller 20 receives engine speed information from an engine speed sensor 27, a target engine torque command from the integrated controller 23, and other necessary information. And, a command to control an engine operating point (Ne, Te) is output to a throttle valve actuator of the eng ENG, for example.

The CVT controller 21 receives information from an accelerator opening sensor 25, a vehicle speed sensor 26, and other sensors 28. Then, when driving with D range selected, a target input rotation speed to be determined by the accelerator opening and the vehicle speed VSP is searched in a shift map, and a control command to attain the target input rotation speed (speed ratio) thus searched will be output to a hydraulic unit (not shown) provided with the belt type CVT 5. In addition to this speed change control, a clutch hydraulic pressure control is carried out with respect to the first clutch 2 and the second clutch 4.

The motor controller 22 receives rotational position information of the rotor, both the target MG (motor/generator) torque command and the target MG rotation speed command from the integrated controller 23, and other necessary information. Then, a command that controls the operating point (Nm, Tm) of the motor/generator 3 is output to the inverter 3. Subsequently, the motor controller 2 is also operative to perform a driving control of a starter motor 6 that outputs a starter activation signal (ON signal) to the startup relay circuit 8 at the time of engine startup.

The integrated controller 23 is responsible for the functions for managing the energy consumption of the whole vehicle, and to drive the vehicle at maximum efficiency. The integrated controller 10, either directly or via CAN communication line 24, receives information of the accelerator opening sensor 25, the vehicle speed sensor 26, the engine speed sensor 27, and other sensor/switch 28.

[Starting Motor Selective Control Configuration]

Figure 2:
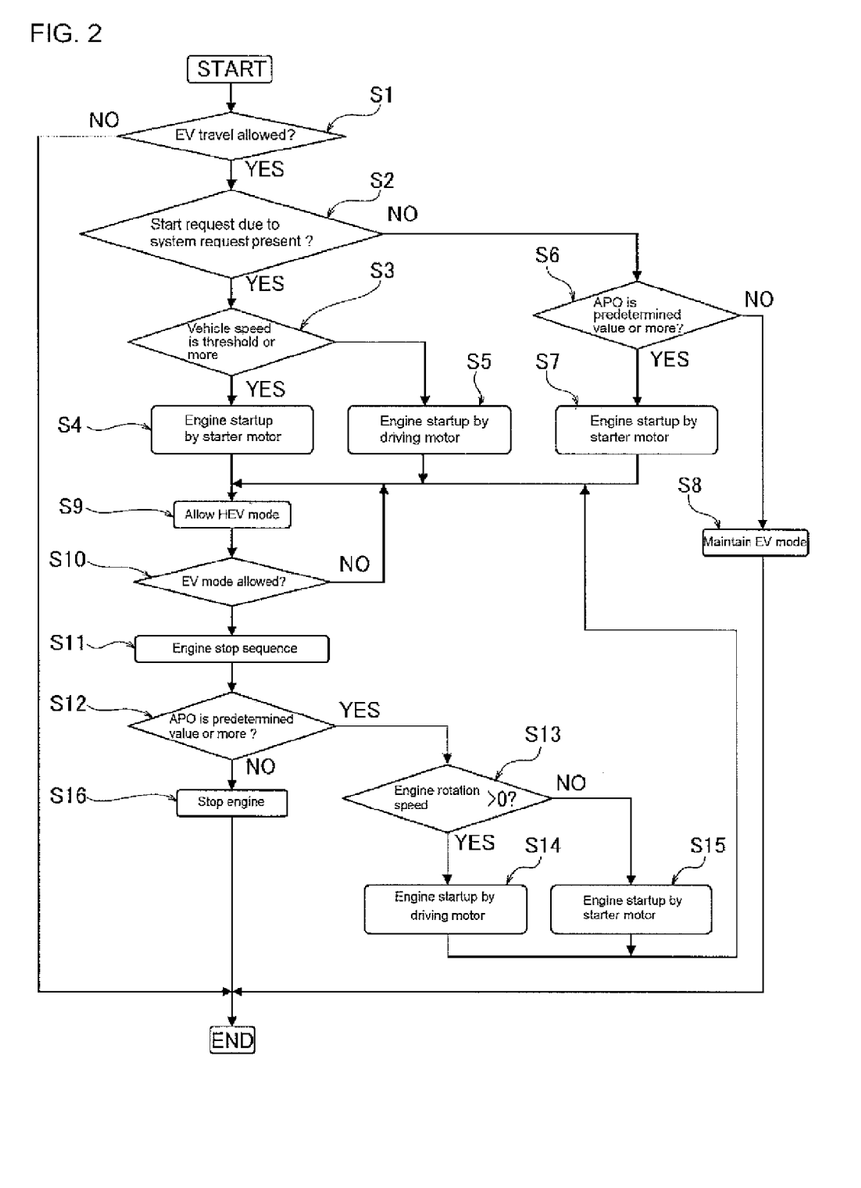
FIG. 2 is a flowchart showing a flow of a starting motor selective use control process executed by an integrated control unit for the FF hybrid vehicle according to one or more embodiments of the present invention.

FIG. 2 is a flowchart showing a flow of a starting motor selective control process (starting motor selective control unit) executed by the integrated controller 23 of the FF hybrid vehicle to which the control device according to one or more embodiments of the present invention is applied. In the following, discussion is made of each step of FIG. 2 representing the starting motor selective control configuration.

In step S1, it is determined whether or not the drive is allowed selecting the "EV mode". The process proceeds to step S2 If YES (EV travel allowed), while the process proceeds to END in case of NO (EV drive is not permitted).

In step S2, following the determination of EV travel being allowed in step S1, it is determined whether or not there is an engine startup request by the system request. The process proceeds to step S3 if YES (i.e., there is a start request by the system requirements), while the process proceeds to step S6 in the case of NO (no engine start request by the system request).

Note that, when examples of the system request initiated starting conditions are listed, such as a road gradient, conditions of an air conditioner, engine speed, engine coolant temperature, atmospheric pressure, brake negative pressure, transmission hydraulic oil temperature, estimated temperature of CL1 facing, high-power battery SOC, available output power from the high-voltage battery, available motor toque, consumption energy other than the driving force, the front defogger switch, rear defogger switch, the three-way catalyst, and the like.

Figure 3:
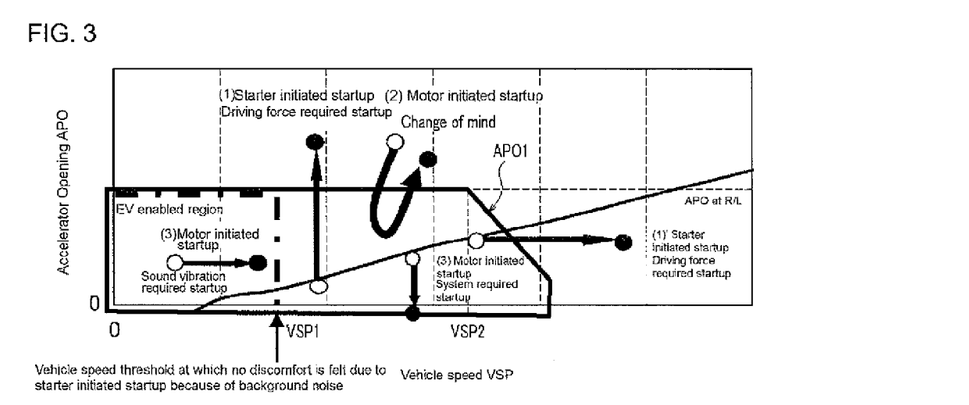
FIG. 3 is a starting motor selection region diagram showing an example of selection areas of the engine starting motor (an example of allocation to respective areas by overlapping in the EV-HEV region map)

In step S3, following the determination for startup request due to a system requirement in step 2, it is determined whether or not the vehicle speed detected by the vehicle speed sensor 26 is equal to or greater than a threshold value. The process proceeds to step S4 if YES (the vehicle speed≥threshold), whereas the process proceeds to step S5 If NO (vehicle speed<threshold). Note that the vehicle speed threshold is set as shown in FIG. 3 at a vehicle speed value VSP1 at which the startup sound at the time of engine startup using the starter motor 6 is inconspicuous with respect to background noise that increases as the vehicle speed increases.

In step S4, following the determination that the vehicle speed≥the threshold value in step S3, an engine start is performed using the starter motor 6, and the process proceeds to step S9.

In step S5, following the determination that the vehicle speed<threshold value in step S3, an engine start is performed using the motor/generator 3, and the process proceeds to step S9.

In step S6, following the determination in step S2 of absence of the startup request due to the system requirement, it is determined whether or not the accelerator opening APO detected by the accelerator opening sensor 25 is equal to or greater than a predetermined value. If YES (APO≥predetermined value), the process proceeds to step S7, whereas the process proceeds to step S8 if NO (APO<predetermined value).

Note that, as shown in FIG. 3, the predetermined value of the accelerator pedal APO is set to an accelerator opening APO1 at which a transition is determined from the "EV mode" enabling region where the motor/generator 3 acts as a driving source to the "HEV mode" enabling region where both the engine 1 and the motor/generator 3 function as the driving source. Stated another way, the accelerator remains constant up until the vehicle speed reaches a predetermined vehicle speed VSP2. However, upon the vehicle speed exceeding the predetermined vehicle speed VSP2, the predetermined value will be given by a value that decreases gradually with increase in the vehicle speed VSP.

In step S7, following the determination that APO≥predetermined value in step S6, that is, following the determination of presence of the engine startup due to a driving force request, the engine startup is carried out by using the starter motor 6, and the process proceeds to step S9.

In step S8, subsequent to the determination that APO<predetermined value in step S6, that is, the determination of absence of the system initiated startup request or the driving force initiated startup request, the vehicle maintains travelling while selecting the "EV mode", and the process proceeds to step S10.

In step S9, following the determination of engine startup in any one of the steps S4, S5, S14, and S15, or the determination of EV drive being not permitted in step S10, the vehicle is allowed while selecting the "HEV mode", and the process proceeds to step S10.

In step S10, following the HEV drive allowance in step S9, it is determined whether or not the travel with the "EV mode" being selected is allowed. The process proceeds to step S11 if YES (EV travel allowed), whereas the process returns to step S9 if NO (EV travel is not allowed).

In step S11, following the determination of the EV travel being allowed in step S10, the process executes the sequence control for the engine stop and proceeds to step S12.

In step S12, following the engine shutdown sequence in step S11, it is determined whether or not the accelerator opening APO detected by the accelerator opening sensor 25 is a predetermined value or more. The process proceeds to step S13 if YES (APO≥predetermined value), while the process proceeds to step S16 if NO (APO<predetermined value).

The predetermined value of the accelerator opening APO at the step S12 is similar to that in step S6.

In step S13, following the determination that APO≥predetermined value in step S12, it is determined whether or not the engine rotation speed Ne detected by the engine speed sensor 27 is greater than zero, i.e., Ne>0. The process proceeds to step S14 if YES (Ne>0), and if NO (Ne=0 engine stop), the process proceeds to step S15.

In step S14, following the determination Ne being greater than zero, i.e., Ne>0, in step S13, the process performs the engine startup using the motor/generator 3 and proceeds to step S9.

In step S15, following the determination Ne being equal to zero, i.e., Ne=0 in step S13, the process performs the engine start using the starter motor 6 and proceeds to step S9.

In step S16, subsequent to the determination that the APO<predetermined value in step S12, the process stops the engine 1 and proceeds to the end.

Now, a description is given of the operation.

First, a conventional example is described. Subsequently, the operations of the control device of the FF hybrid vehicle according to one or more embodiments of the present invention is described separately, i.e., with respect to "selective operation of the engine starting motor", "engine startup operation by system requirement or request", "engine startup operation by the driving force request", "engine startup operation by change of mind", and "engine startup operation by a representative example".

Such a comparative example is assumed in which, in a hybrid vehicle, when the engine is started while traveling in "EV mode", the engine startup is carried out using the starter motor at all times.

In this comparative example, when the engine is started in the running of state in which background noise (=environmental noise) is low, the sound accompanied by the jump in gear or driving of the starter motor is headed by the occupant. In particular, when the engine startup scene occurs due to a system initiated requirement for engine startup against the intention of the driver, it would give a sense of discomfort to the driver.

As examples of the engine startup scene in response to the system requesting system, situations such as a low-battery charge capacity, the increase in air conditioning load, an increase in power consumption other than the driving force, and the like are contemplated. In this system required startup scene and in a state in which the accelerator pedal is held at a constant opening, if the engine would be started using the starter motor, the jump-in sound or the driving sound are heart, which would give the occupant a sense of discomfort. Further, in the system required startup scene at vehicle external noise being low with the engine rotating at idle speed, when the engine is started by a starter motor, a sense of discomfort is given to the occupant as well.

When seeking to eliminate the discomfort describe above, the conditions of transition from the travel in "EV mode" to "HEV mode" is confined to such a case in which, for example, the accelerator pedal is not kept at a constant, and the engine is not in an idle state. As a result, the prospectus that fuel economy improvement to be achieved by starting the engine by the starter motor will be smaller than desired.

Furthermore, due to engine startup operations using the starter motor at all times, the frequency of use of the starter motor is high so that durability may exceed a set value prior to elapse of a vehicle life time and the starter motor is compelled to be replaced during the vehicle life time.

[Selective Operation of Engine Starting Motor]

It is necessary to make the index or criteria clear according to which the two motors, i.e. a starter motor and a driving motor are selectively used. The following describes the operation of the selective use of engine starting motor, which reflects this situation with reference to FIGS. 3 to 6.

Figure 4:
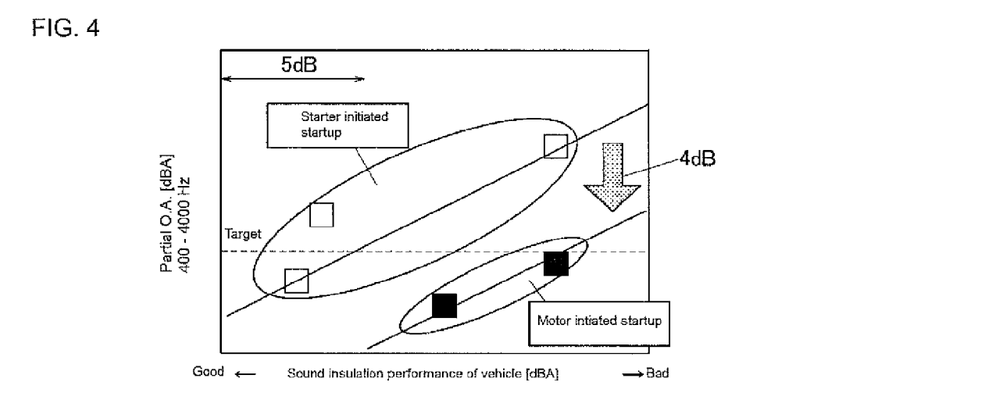
FIG. 4 is a performance comparison characteristic diagram showing difference in a sound vibration performance difference between an engine startup using a starter motor and that using a driving motor.

First, when comparing the performances of sound vibration between the case of the engine being started by the starter motor and the case of engine start by the driving motor, as shown in FIG. 4, the relation that the starter initiated startup> the motor initiated startup is confirmed and a difference in the order of 4 dB is detected between the starter initiated startup and the driving motor initiated startup.

Figure 5:
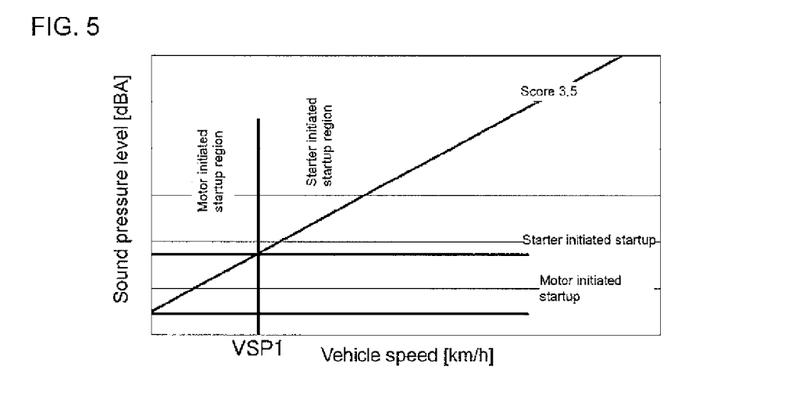
FIG. 5 is a vehicle speed-sound pressure level characteristic diagram indicating the concept of regional allocation of the starting motor at the time of engine startup in response to a system request in the starting motor selective control process according to one or more embodiments of the present invention.

Although background noise increases with increase in vehicle speed, if it is possible to suppress the engine start sound noise below this background noise level, the score or rating against discomfort would be high even at an engine startup. For example, as shown in FIG. 5, assuming that the score of 3.5 corresponds to a level where discomfort is inconspicuous, in a region below a vehicle speed VSP1 where background noise is small, it is necessary for the driving motor startup region to be allocated in order to achieve the score 3.5. However, in the vehicle speed region greater than VSP1, the score of 3.5 is achieved even if the starter startup region is allocated.

First, based on the comparison of sound vibration performance in FIG. 4, in the case of engine startup due to a system request or requirement where the engine start would be unintentional, the engine is started using a driving motor from the viewpoint that a sense of discomfort will not be given. In contrast, in the case of the engine startup due to a driving force request to engine start-up deliberately, from the point of view that the driver would not be worried about the engine startup sound as the noise, the engine startup is performed using the starter motor. These represent the basic selection criteria of an engine starting motor.

Further, when starting the engine due to a system request or requirement, instead of performing the engine startup using the driving motor at all times, based on the noise rating in FIG. 5, although the driving motor is used in a low vehicle speed region, in the high vehicle speed region where the background noise is large, the starter motor is in place. At this time, the threshold value distinguishing the low vehicle speed region and the high vehicle speed region is set at a vehicle speed value VSP1 at which the starting sound at the time of engine startup using the starter motor 6 will be rated as inconspicuous with respect to the background noise, which increases in accordance with vehicle speed increase (see FIGS. 3, 6).

Further, as shown in FIG. 3, a predetermined value of the accelerator opening degree APO at which the engine is started due to a driving force request is set at an accelerator opening value APO1 by which a determination is made for the transition from the "EV mode" enabling region using the motor/generator 3 as driving source to the "HEV mode" selection region using both the engine 1 and the motor/generator 3 as driving source. In this instance, when the mode region is mapped, the "EV mode" enabling region is configured to be expanded at all times compared to the "EV mode" enabling region that starts up the engine using the driving motor at all times. This is because the driving motor representing the driving source in the "EV mode" is not required to set aside a motor torque for an engine startup. The specific selection pattern depending on each scene of the engine starting motor will now be described with reference to FIG. 6.

Figure 6:
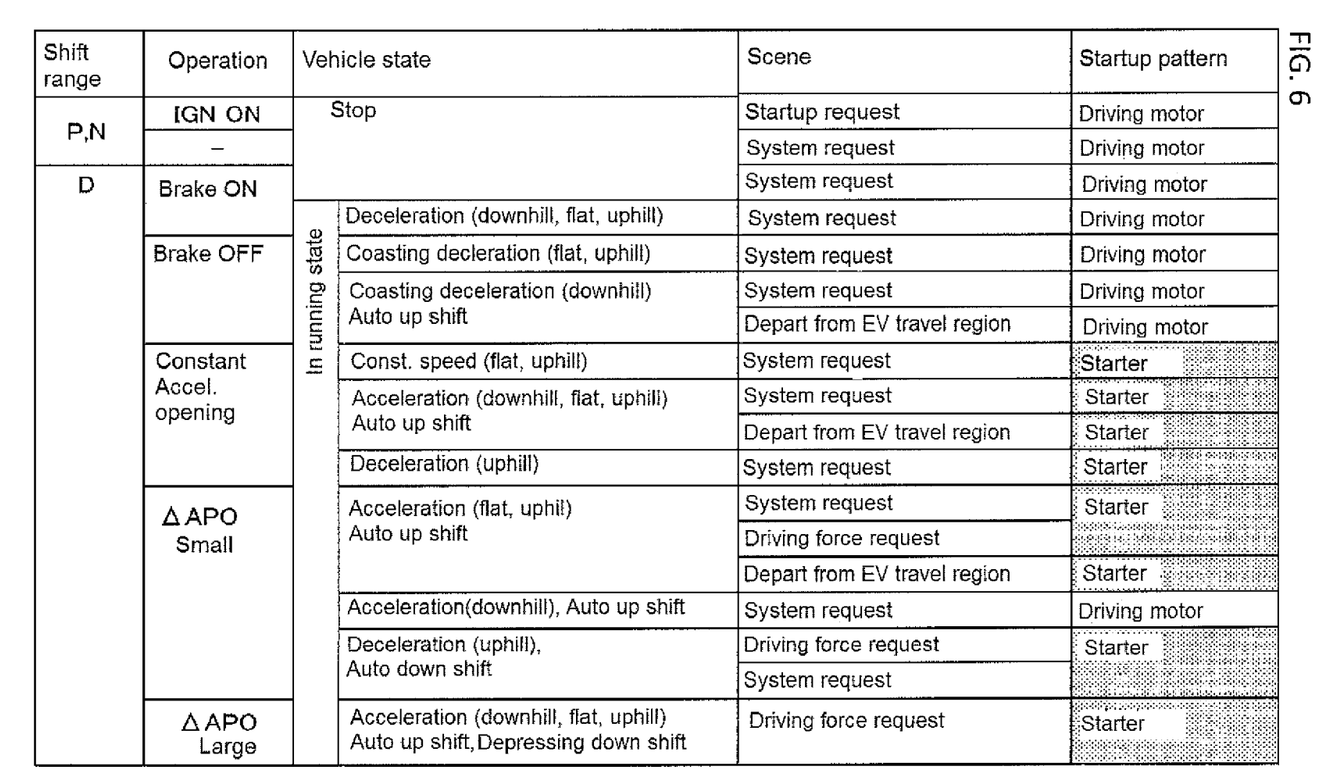
FIG. 6 is a selection pattern diagram showing a specific pattern of selection in the starting motor selective control process according to one or more embodiments of the present invention.

First, when the vehicle is stopping with P, N, or D range, the associated background noise is small. Therefore, irrespective of startup of driving force initiated or system initiated, the engine will be started using a driving motor.

Then, out of the running states with the accelerator released in the D range, such running states as deceleration (downhill, flat, uphill), coasting deceleration (flat, uphill), coasting acceleration (downhill), and automatic up shifting operate with small background noise. Thus, regardless of the system initiated startup or depart from the EV mode region (driving force initiated), the engine startup will be carried out with the driving motor.

Further, out of the running states with the accelerator opening constant at D range, constant speed (flat, uphill), acceleration (downhill, flat, uphill), auto up shift, and deceleration (uphill) represent a large background noise. Thus, regardless of the system initiated startup or depart from the EV mode region (driving force initiated), the engine startup will be carried out with the starting motor.

Further, out of the running states with the small amount of accelerator opening small (i.e., $\Delta$ APO is small) at D range, acceleration (flat, uphill), deceleration (uphill), and automatic up shifting of these represent a large background noise. Thus, regardless of the system initiated startup, driving force initiated startup or startup in response to departure from the EV mode region (driving force initiated), the engine startup will be carried out with the starter motor. However, in the case of acceleration (downhill) or auto up shifting, the background noise is small. Therefore, when initiated by the system, the engine startup will be executed with the driving motor.

Furthermore, out of the running states with the accelerator opening large (i.e., $\Delta$ APO is large) at D range, acceleration (downhill, flat, uphill), auto shifting up, and downshifting with accelerator pressed down operate with a large background noise. Thus, at the driving force initiated startup, the starter motor is used for the engine startup.

[Engine Startup Operation Due to the System Request]

As described above, at the engine startup due to the system requirement or request, reduction in discomfort is necessary. Thus, engine start-up is performed by the driving motor basically. A description is given below with reference to FIG. 2 of the effect of the engine startup operation due to system request reflecting this situation.

In a state of EV running, upon startup requirement due to the system request, when the vehicle speed VSP is equal to or above a threshold value, in the flowchart shown in FIG. 2, the process proceed along step S1→step S2→step S3→step S4. In step S4, the engine startup is performed using the starter motor 6.

On the other hand, during a state of EV running being allowed, upon a startup requirement due to a system request, when the vehicle speed VSP is equal to or greater than the threshold value, in the flowchart in FIG. 2, the process proceeds along step S1→step S2→step S3→step S5. In step S5, the engine startup is performed using the motor/generator 3.

Thus, as the engine startup operations due to the system requirements, reduction in battery SOC in a high voltage battery 10, increase in air conditioning load, increase in power consumption other than the driving force, and the like are contemplated. That is, the engine starting due to the system request will not be predictable for the driver with respect to time of engine startup.

Accordingly, in the case of engine starting by the system request and when the vehicle speed VSP is the threshold VS1 or above, even at unintentional engine startup sound, the score against the discomfort is high due to a large background noise, the engine startup will be executed by the starter motor 6.

Thus, during EV mode travel using the motor/generator 3 as driving source, it is not necessary for the torque of the motor/generator 3 to distribute the engine startup torque, the occurrence of a slowdown due to engine starting can be prevented.

On the other hand, in the case of engine startup by the system request, when the vehicle speed VSP is below the threshold VS1, if the engine starting sound is emitted unexpectedly with a small background noise, the score against discomfort is reduced. Thus, the engine startup operation will be selected to be performed using the motor/generator 3.

Thus, by making the engine starting by the motor/generator 3 which exhibits good sound vibration performance compared to engine start by the starter motor 6, the discomfort to the occupant given by the engine startup sound is reduced.

[Engine Startup Operation by the Driving Force Request]

As described above, when the engine is started by the driving force request, because it is a situation where the uncomfortable feeling can be suppressed, the engine starting is affected by the starter motor basically. A description is given below with reference to FIG. 2 of the engine startup operation due to the driving force request reflecting this situation.

In an EV mode travel permission time with no startup request by the system request, when an accelerator opening APO is a predetermined value or more, in the flowchart of FIG. 2, the process proceeds to step S1→step S2→step S6→step S7. In step S7, engine start is performed using the starter motor 6.

On the other hand, in the EV mode travel permission with no startup request by system request, when the accelerator opening APO is less than the predetermined value, in the flowchart of FIG. 2, the process proceeds along to step S1→step S2→Step S6→step S8. In step S8, the EV driving mode is maintained.

Thus, when the engine is started by the driving force request, the engine start sound will reach the driver in a state in which background noise is small. However, since the engine start sound is representative of the accelerator depression operation which reflects the intention of the driver requesting for driving force, the engine startup sound corresponding to the accelerator depression operation would not be uncomfortable for the driver. Therefore, when there is an engine start up by a driving force request, the engine starting will be performed by the starter motor 6.

Then, when there is the driving force request, by allowing starter motor 6 to share the engine start, it is possible to use the torque by the three motor/generator 3 as a driving torque to the left and right front driving wheel 12, 12.

Therefore, in the start of the engine startup by the driving force request, without giving an uncomfortable feeling to the driver, the expansion of the running region according to "EV mode" with the motor/generator 3 as driving force is achieved.

[The Engine Startup Effect by Change of Mind]

During the HEV driving mode, in the case of a so-called "change of mind" operation in which, although the vehicle has entered the EV enabled region in response to release of the accelerator pedal, a depressing operation immediately thereafter requires the system to return to the HEV region, it is necessary to perform an efficient selective control of the engine starting motor. A description is given of the engine startup operation due to the change of mind reflecting this situation.

When the accelerator opening APO reaches the predetermined value or more immediately after the transition from the HEV driving mode to the EV mode, and when the engine 1 is rotating, in the flowchart in FIG. 2, the process proceeds along step S9→step S10→step S11→step S12→step S13→step S14. In step S14, the engine startup is performed using the motor/generator 3.

On the other hand, the accelerator opening APO reaches the predetermined value or more immediately after the transition from the HEV driving mode to the EV mode, and when the engine 1 is in a stopped state, the process proceeds in the flowchart of FIG. 2 along step S9→step S10→step S11→step S12→the process proceeds to step S13→S15. In step S15, the engine startup is performed using the starter motor 6.

Incidentally, when the accelerator opening APO becomes less than the predetermined value after the EV travel permission following the HEV driving mode, in the flowchart of FIG. 2, the process proceeds to along step S9→step S10→step S11→step S12→step S16→end. In step S16, the engine 1 is stopped.

As described above, when the engine is started by the driving force request with the accelerator opening APO greater than or equal to the predetermined value, discomfort is not an issue. Thus, an engine startup using the starter motor 6 is acceptable. However, when the accelerator opening APO becomes a predetermined value or more immediately after the EV travel mode permission from the HEV driving mode and when the engine 1 is rotating, a cranking operation is not required.

Therefore, when the engine is startup in the engine rotating state by the change of mind, the engine is started smoothly with better response when using the motor/generator 3 than using the starter motor 6.

[Engine Startup Operation in a Representative Example]

The engine startup pattern presents, as shown in FIG. 3, various patterns according to change in the operating point defined by the vehicle speed VSP and the accelerator opening APO. A description is given below with reference to FIGS. 7 to 10 of the engine startup operations by the representative examples reflecting this situation.

Figure 7:
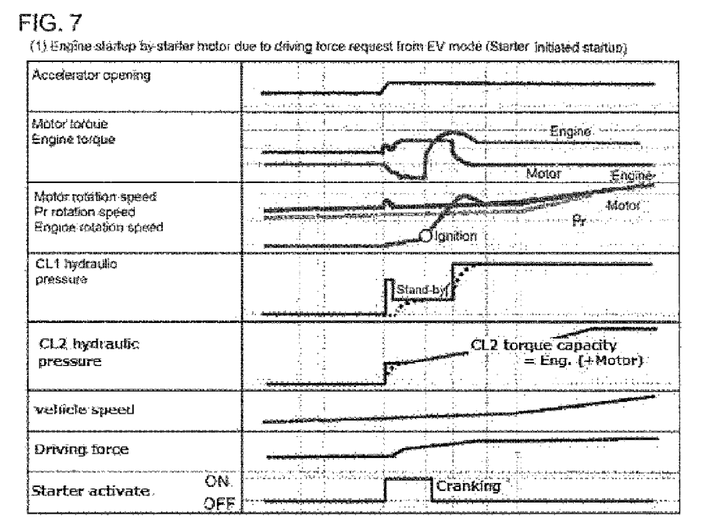
FIG. 7 is a time chart showing respective characteristics of an accelerator opening, a motor torque, an engine torque, a motor rotation speed, a primary rotation speed, an engine rotation speed, a first clutch hydraulic pressure, a second clutch hydraulic pressure, a vehicle speed, a driving force, and starter activation signal when the engine is started in response to a driving force request due to accelerator depression during running in the EV mode in the FF hybrid vehicle on which the control device according to one or more embodiments of the present invention installed.

In the FF hybrid vehicle on which the control device according to one or more embodiments of the present invention is installed, as shown in FIG. 3(1), when the engine is started in response to the accelerator depression operation in the running state of the EV region (=in response to a driving force request), as shown in FIG. 7, the engine is started using the starter motor 6.

That is, when the accelerator opening APO becomes a predetermined value APO1 or more, the starter activation signal is set to from OFF to ON (i.e. OFF→ON), the engine 1 is started through cranking operation by the starter motor 6.

Figure 8:
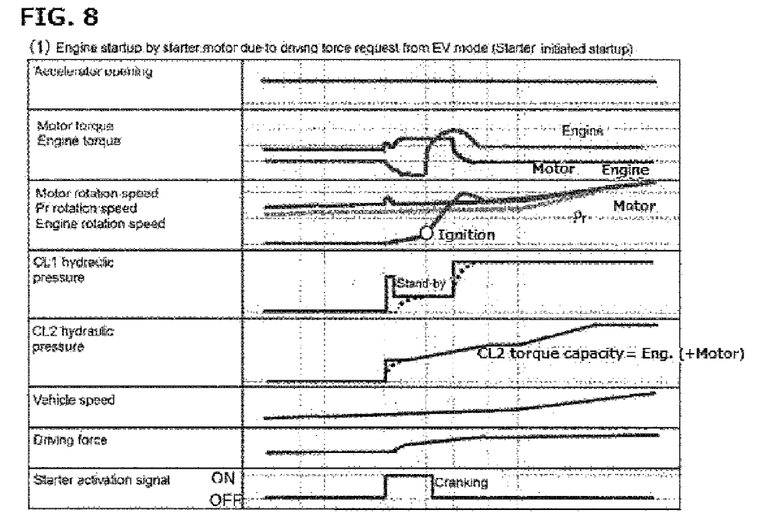
FIG. 8 is a time chart showing respective characteristics of an accelerator opening, a motor torque, an engine torque, a motor rotation speed, a primary rotation speed, an engine rotation speed, a first clutch hydraulic pressure, a second clutch hydraulic pressure, a vehicle speed, a driving force, and starter activation signal when the engine is started in response to a driving force request due to increase in the vehicle speed during running in the EV mode in the FF hybrid vehicle on which the control device according to one or more embodiments of the present invention is installed.

In the FF hybrid vehicle on which the control device according to one or more embodiments of the present invention is installed, as shown in FIG. 3(1)', when the engine is started in response to increase in vehicle speed from the EV running enabled region (=in response to driving force request), as shown in FIG. 8, the engine is started using the starter motor 6.

That is, despite the accelerator opening APO being constant, in response to an increase in the vehicle speed VSP so that a predetermined value APO1 is crossed to enter the HEV region, the starter activation signal is set from OFF to ON, the engine 1 is cranked to startup by the starter motor 6.

Figure 9:
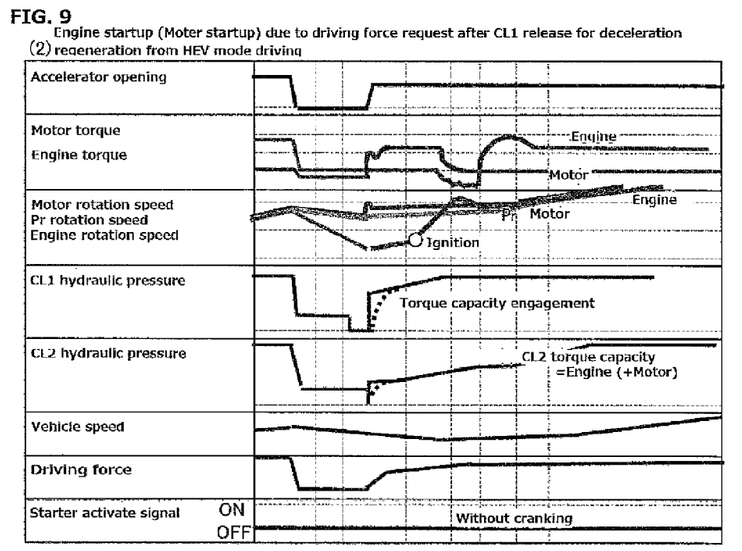
FIG. 9 is a time chart showing respective characteristics of an accelerator opening, a motor torque, an engine torque, a motor rotation speed, a primary rotation speed, an engine rotation speed, a first clutch hydraulic pressure, a second clutch hydraulic pressure, a vehicle speed, a driving force, and starter activation signal when the engine is started in response to a driving force request due to change of mind operation during running in the EV mode in the FF hybrid vehicle on which the control device according to one or more embodiments of the present invention is installed.

In the FF hybrid vehicle on which the control device according to one or more embodiments of the present invention is installed, as shown in FIG. 3(2), when the engine is started in response to a change of mind operation (=driving force request) during the HEV driving mode, as shown in FIG. 9, the engine is started up using the motor/generator 3.

That is, at the time to start up the engine due to the change of mind operation during the HEV mode of running with the engine 1 being rotated, the motor torque of the motor/generator 3 is converted from a negative torque (regenerative deceleration) to a positive torque to thereby start the engine while increasing the rotation thereof.

Figure 10:
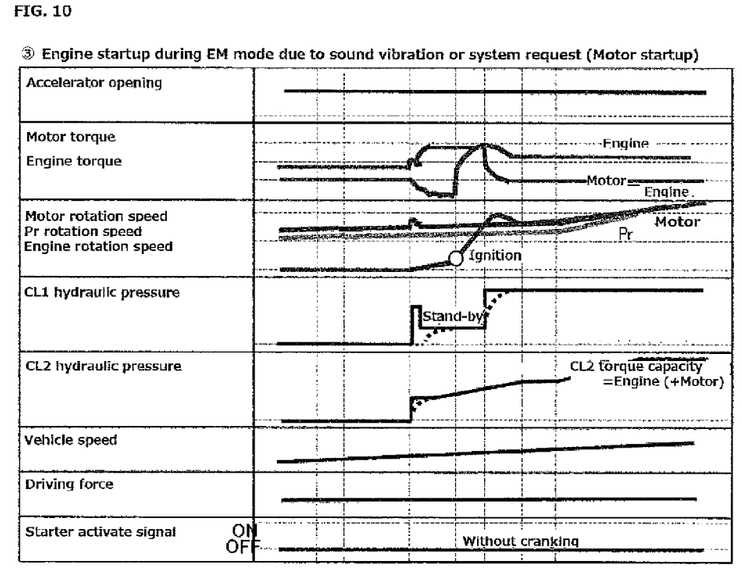
FIG. 10 is a time chart showing respective characteristics of an accelerator opening, a motor torque, an engine torque, a motor rotation speed, a primary rotation speed, an engine rotation speed, a first clutch hydraulic pressure, a second clutch hydraulic pressure, a vehicle speed, a driving force, and starter activation signal when the engine is started in response to a driving force request due to a system initiated request during running in the EV mode in the FF hybrid vehicle on which the control device according to one or more embodiments of the present invention is installed.

In the FF hybrid vehicle on which the control device according to one or more embodiments of the present invention is installed, as shown in FIG. 3(3), (3)', when the engine is started in response to a system request during EV mode of travel, as shown in FIG. 10, the engine is started up using the motor/generator 3.

That is, when in (3) in response to a system request during EV mode of running with the vehicle speed VSP below the threshold VSP1, or, when in (3)' in response to a system request during EV mode of running with the vehicle being under coasting deceleration, the engine 1 is started up quietly or gently through control of torque of the motor/generator 3 and the first clutch 2.

Now, a description is given of the effect.

A control device of the FF hybrid vehicle according to one or more embodiments of the present invention may obtain one or more of the following effects.

(1) Provided are an engine 1;

a starter motor 6 for starting the engine 1;

a driving motor (motor/generator 3) which is enabled to transmit a motor torque to both the engine 1 and a drive wheel (left and right front wheel 12, 12);

a starting motor selective control unit (FIG. 2) that is operative to start the engine using the starter motor 6 in response to a driving force request during a selected mode of operation (during EV mode being selected) in which the driving motor (motor/generator 3) serves as the driving source while being operative to start the engine using the driving motor (motor/generator 3) in response to a system request.

Therefore, it is possible in the engine startup due to a system request to reduce the discomfort to the occupant due to the engine start sound.

(2) The starting motor selective control unit (FIG. 2) is configured to start the engine using the driving motor (motor/generator 3) in response to a system initiated engine startup when the vehicle speed VSP is less than a threshold value VSP1, while to perform an engine startup using the starter motor 6 in response to the system initiated engine startup when the vehicle speed VSP is equal to the threshold value VSP1 or above (step S1 through step S5).

Therefore, in addition to the effect of (1), at the time of engine startup due to a system request when the vehicle speed VSP is less than the threshold value VSP1, it is possible to reduce the discomfort given to the occupant by the engine start sound while preventing the occurrence of a slowdown by the engine starting with the drive motor (motor/generator 3) when the vehicle speed VSP is the threshold value VSP1 or more.

(3) The starting motor selective control unit (FIG. 2) is configured set the threshold value VSP1 of the vehicle speed VSP at a vehicle speed value at which the motor start sound at engine startup using the starter motor 6 is evaluated to be inconspicuous with respect to background noise, which increases with an increase in vehicle speed (step S3). Therefore, in addition to the effects of (2), even at an engine startup operation by a system request using a starter motor 6, it is possible to suppress the discomfort to the occupant.

(4) The starting motor selective control unit (FIG. 2) is configured to start the engine using the starter motor 6 (step S6, step S7), during a running state with a mode being selected in which the driving motor (motor/generator 3) serves as driving source (i.e. EV driving mode), when the accelerator pedal APO is equal to a predetermined value APO1 or more.

Therefore, it is possible, in addition to the effects (1) to (3), to determine the magnitude of the driving force request of the driver based on the accelerator opening APO.

(5) The starting motor selective control unit (FIG. 2) is configured to start the engine using the driving motor (motor/generator 3) during transition from a mode (HEY mode) in which both the engine 1 and the driving motor (motor/generator 3) serve as driving force to a mode (EV mode) in which the driving motor (motor/generator 3) serves as driving source, when the accelerator opening APO becomes a predetermined value APO1 or more (step S9 through step S15).

Therefore, it is possible, in addition to the effects (1) to (4), to start up the engine while rotating due to the change of mind operation, to start the engine smoothly with good response while suppressing the sound at an engine startup.

(6) The starting motor selective control unit (FIG. 2) is configured to set the predetermined value APO1 of the accelerator opening APO at an accelerator opening value at which a determination is made for transition from a mode (EV mode) in which the driving motor (motor/generator 3) serves as driving source to a mode (HEV mode) in which both the engine 1 and the driving motor (motor/generator 3) serve as driving force (step S6, step S12).

Therefore, in addition to the effect of (4) or (5), at the startup of the engine by the driving force request, the selective use of the modes (EV mode, HEY mode) and the selective control of starting motor (motor/generator 3, the starter motor 6) can be matched with each other.

Although embodiments of a control device for a hybrid vehicle are described above, the specific configurations are not limited to the above embodiments. Rather, alteration or addition may be allowed.

In one or more of the above embodiments, at the system initiated engine startup operation, the starting motor selective control unit is configured to selectively use the motor/generator 3 and the starter motor 6 depending on the magnitude of the vehicle speed VSP. However, one or more embodiments of the present invention may be configured to perform an engine startup using the driving motor (motor/generator) irrespective of the magnitude of the vehicle speed, when starting the engine by the system request.

In one or more of the above embodiments, the starting motor selective control unit is configured to set the engine startup request by the driving force request at an accelerator pedal opening APO at a predetermined value APO1 or more. However, the predetermined value for driving force request determination threshold may be given, not by a constant value, but by a variable dependent on an accelerator opening speed $\varDelta$APO (=accelerator depression speed), road gradient, or operation of a blinker lever or turn signal switch, and the like. When the variable is given by the accelerator opening speed $\varDelta$APO, such a selective use of the starting motor may be obtained with an optimal response of vehicle. When the variable is given by the road gradient, the allocation of driving force may be set variable with respect to the accelerator opening. Further, when the variable value is given depending on the operation of the turn signal switch, a response oriented engine startup may be available when turning right or left.

In one or more of the above embodiments, the control device of a hybrid vehicle is applied to a one-motor-two-clutch, FF hybrid vehicle. However, the control device according to one or more embodiments of the present invention may be equally applicable to an FF, or FR hybrid vehicle that does not include in a driveline a first clutch 2, a second clutch 4 or belt type CVT 5. In short, one or more embodiments of the present invention can be applied to any control device for a hybrid vehicle including an engine starter motor, and a driving motor that also serves as an engine starting motor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for a hybrid vehicle, comprising:
   an engine;
   a starter motor operable to start the engine;
   a driving motor, provided separately from the starter motor and interposed between the engine and a driving wheel, that transmits a motor torque to the engine and a drive wheel when the driving motor is a driving source; and
   a starting motor selective control unit that selects one of the starter motor and the driving motor to start the engine,
   wherein the starting motor selective control unit starts the engine using the starter motor in response to a driving force request by a driver of the hybrid vehicle as expressed in an accelerator pedal depressing operation and during a selected mode of operation in which the driving motor serves as the driving source, and
   wherein the starting motor selective control unit starts the engine using the driving motor in response to a system request and during the selected mode of operation in which the driving motor serves as the driving source.

2. A control device for a hybrid vehicle, comprising:
   an engine;
   a starter motor that starts the engine;
   a driving motor that transmits a motor torque to the engine and a drive wheel;
   a starting motor selective control unit that starts the engine using the starter motor in response to a driving force request by a driver of the hybrid vehicle during a selected mode of operation in which the driving motor serves as the driving source, and that starts the engine using the driving motor in response to a system request, wherein the starting motor selective control unit starts the engine using the driving motor in response to a system initiated engine startup when the vehicle speed is less than a threshold value, and wherein the starting motor selective control unit performs an engine startup using the starter motor in response to the system initiated engine startup when the vehicle speed is equal to or greater than the threshold value.

3. The control device as claimed in claim 2, wherein the starting motor selective control unit sets the threshold value of the vehicle speed at a vehicle speed value at which the motor start sound at engine startup using the starter motor is evaluated to be less than a first noise threshold with respect to background noise, wherein the background noise increases with an increase in vehicle speed.

4. The control device as claimed in claim 1, wherein the starting motor selective control unit starts the engine using the starter motor, during a running state with a mode being selected in which the driving motor serves as driving source, when an accelerator opening of the accelerator pedal is equal to or greater than a predetermined value.

5. The control device as claimed in claim 1, wherein the starting motor selective control unit starts the engine using the driving motor during transition from a mode in which both the engine and the driving motor serve as driving force to a mode in which the driving motor serves as driving source, when the accelerator opening becomes equal to or greater than a predetermined value.

6. The control device as claimed in claim 4, wherein the starting motor selective control unit sets the predetermined value of the accelerator opening at an accelerator opening value at which a determination is made for transition from a mode in which the driving motor serves as driving source to a mode in which both the engine and the driving motor serve as driving force.

7. The control device as claimed in claim 2, wherein the starting motor selective control unit starts the engine using the starter motor, during a running state with a mode being selected in which the driving motor serves as driving source, when an accelerator opening of the accelerator pedal is equal to or greater than a predetermined value.

8. The control device as claimed in claim 3, wherein the starting motor selective control unit starts the engine using the starter motor, during a running state with a mode being selected in which the driving motor serves as driving source, when the accelerator pedal is equal to or greater than a predetermined value.

9. The control device as claimed in claim 2, wherein the starting motor selective control unit starts the engine using the driving motor during transition from a mode in which both the engine and the driving motor serve as driving force to a mode in which the driving motor serves as driving source, when the accelerator opening becomes equal to or greater than a predetermined value.

10. The control device as claimed in claim 3, wherein the starting motor selective control unit starts the engine using the driving motor during transition from a mode in which both the engine and the driving motor serve as driving force to a mode in which the driving motor serves as driving source, when the accelerator opening becomes equal to or greater than a predetermined value.

11. The control device as claimed in claim 4, wherein the starting motor selective control unit starts the engine using the driving motor during transition from a mode in which both the engine and the driving motor serve as driving force to a mode in which the driving motor serves as driving source, when the accelerator opening becomes equal to or greater than a predetermined value.

12. The control device as claimed in claim 5, wherein the starting motor selective control unit sets the predetermined value of the accelerator opening at an accelerator opening value at which a determination is made for transition from a mode in which the driving motor serves as driving source to a mode in which both the engine and the driving motor serve as driving force.

13. A method for controlling a hybrid vehicle, comprising:

accepting a driving force request from a driver of the hybrid vehicle as expressed in an accelerator pedal depressing operation;

starting, via a starting motor selective control unit that selects one of a starter motor and a driving motor to start an engine, the engine using the starter motor in response to the driving force request and during a selected mode of operation in which the driving motor that transmits a motor torque to the engine and a drive wheel serves as a driving source, and starting the engine using the driving motor in response to a system request and during the selected mode of operation in which the driving motor serves as the driving source, wherein the driving motor is provided separately from the starter motor and is interposed between the engine and the driving wheel.

14. The method as claimed in claim 13, further comprising:

starting the engine using the driving motor in response to a system initiated engine startup when the vehicle speed is less than a threshold value, and performing an engine startup using the starter motor in response to the system initiated engine startup when the vehicle speed is equal to or greater than the threshold value.

15. The method as claimed in claim 14, further comprising:

setting the threshold value of the vehicle speed at a vehicle speed value at which the motor start sound at engine startup using the starter motor is evaluated to be less than a first noise threshold with respect to background noise, wherein the background noise increases with an increase in vehicle speed.

16. The method as claimed in claim 13, further comprising:

starting the engine using the starter motor, during a running state with a mode being selected in which the driving motor serves as driving source, when an accelerator opening of the accelerator pedal is equal to or greater than a predetermined value.

17. The method as claimed in claim 13, further comprising:

starting the engine using the driving motor during transition from a mode in which both the engine and the driving motor serve as driving force to a mode in which the driving motor serves as driving source, when the accelerator opening becomes equal to or greater than a predetermined value.

18. The method as claimed in claim 16, further comprising:
setting the predetermined value of the accelerator opening at an accelerator opening value at which a determination is made for transition from a mode in which the driving motor serves as driving source to a mode in which both the engine and the driving motor serve driving force.

* * * * *